Patented May 16, 1944

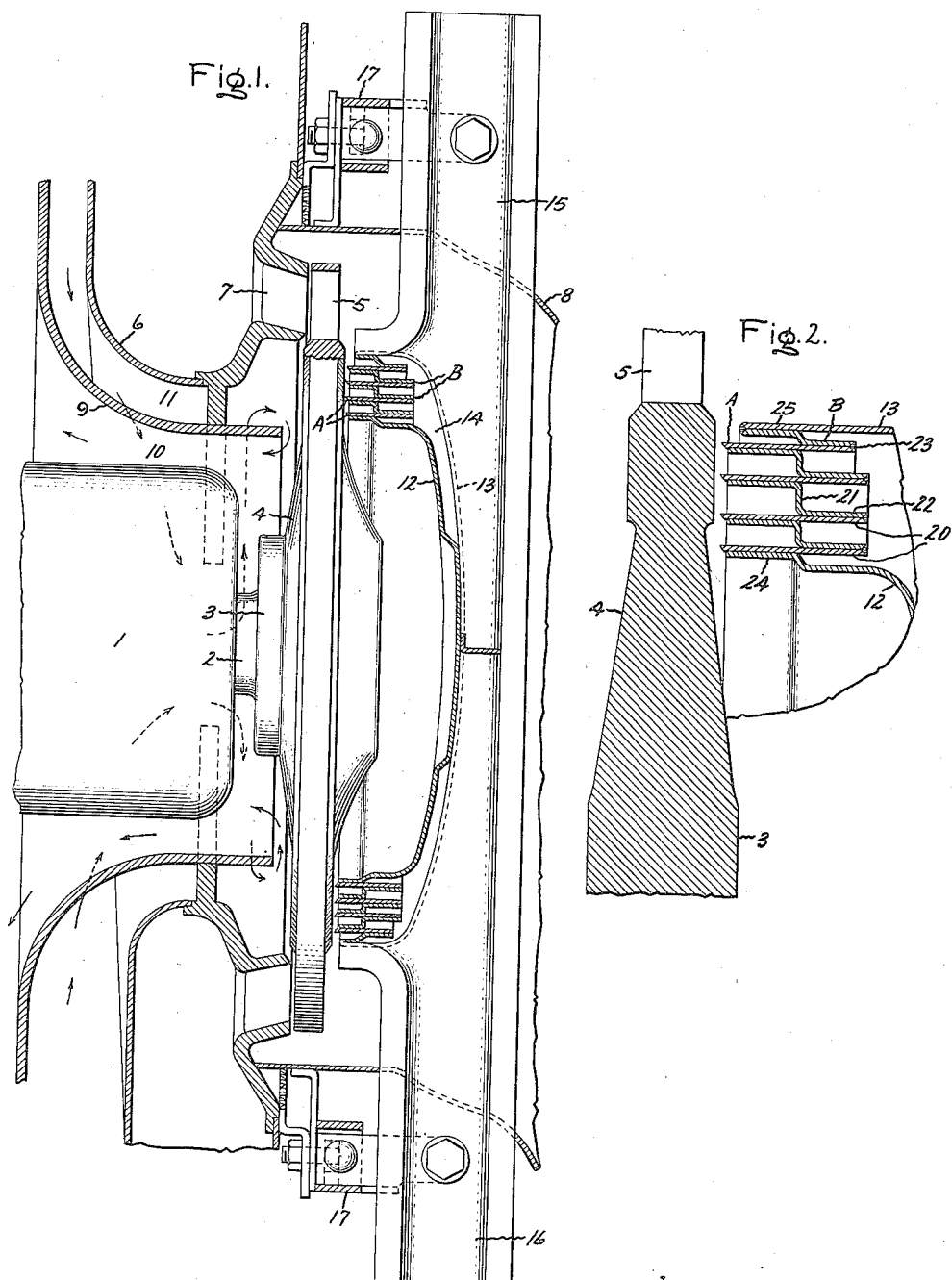

2,348,748

UNITED STATES PATENT OFFICE 2,348,748

GAS TURBINE

Walter I. Nichols, Saugus, Mass., assignor to General Electric Company, a corporation of New York Application April 17, 1942, Serial No. 439,412

4 Claims. (Cl. 60—41)

The present invention relates to gas turbines and especially to gas turbines such as are used on aircraft, for example turbo-superchargers, although it is not limited thereto necessarily.

In connection with gas turbines it is desirable in instances to provide adjacent to one or both surfaces of the turbine wheel disk a cooling and protecting wall to carry away heat from the wheel and protect the wheel disk from hot gases supplied to the turbine wheel buckets and, to this end, to provide the wall on the side next to the wheel with radially spaced axially extending concentric spill bands and heat conducting fins which have a close clearance with the rim of the wheel disk and on the other side with similar fins which function as cooling fins.

The object of my invention is to provide an improved construction of wall embodying fins on each side thereof, and for a consideration of what I believe to be novel and my invention attention is directed to the following specification and the claims appended thereto.

In the drawing, Fig. 1 is a sectional view of a part of a supercharger having a cooling cap embodying my invention, and Fig. 2 is a detail sectional view on a larger scale of certain parts.

Referring to the drawing, 1 indicates a bearing in which is mounted a shaft 2 having on its end a turbine wheel comprising a hub 3, a disk 4 and a ring of buckets 5. Surrounding the bearing in spaced relation thereto is an annular nozzle box 6 having a ring of nozzles 7 for directing gases to the turbine buckets, and carried by the nozzle box is a flight hood 8 for directing exhaust gases issuing from the turbine buckets to a point of discharge. At 9 is an annular wall which defines cooling air passages 10 and 11. In front of the turbine wheel is a cooling cap comprising spaced walls 12 and 13 which define a cooling air chamber 14 to which cooling air is conducted through a conduit 15 and from which it is discharged through a conduit 16. The cooling cap is supported from the nozzle box by suitable supports 17. The cooling cap comprises a plurality of spaced concentric axially extending rings A which function as spill bands and heat conducting fins and a plurality of spaced concentric axially extending rings B which function as cooling fins. Rings A have close clearance with the adjacent surface of the wheel disk to prevent flow of hot gases across the face of the wheel.

My invention has to do specifically with the structure of the rings A and B.

According to the embodiment of my invention illustrated in the drawing, I construct rings A and B from a plurality of radially spaced straight cylindrical rings 20 between which are located rings which are Z-shaped in cross-section, the radially extending portions 21 of the Z-rings serving as spacers or spacing disk rings and the axially extending portions 22 of the Z-rings forming flanges in engagement with adjacent straight rings 20 and suitably attached thereto as by brazing, welding, or the like. Preferably I join the edges of fins B by welding as is indicated at 23 and I attach the flat surfaces together by seam welding. Any suitable number of fins A and B may be provided. In the present instance I have shown four of each. It will be seen that walls 12 and 13 are provided with spaced apart axially extending portions 24 and 25 between which the fins A and B are positioned.

By my invention I provide in substance a radially extending flat wall which is parallel to a face of the wheel and which is of a single thickness, such wall being formed from the radially extending portions 21, and axially extending fins on each side of such wall which are of double thickness.

For aircraft applications, it is desirable that structures be as light in weight as possible. My construction has the advantage that it may be constructed from relatively thin material and still be amply strong and rigid since the fins are of double thickness. This double thickness and the edgewise construction serves to keep the structure from warping even at the high temperatures to which it is subjected. At the same time, the structure has some flexibility parallel to the plane of the wheel which keeps it from going out of shape when there is considerable difference in temperature between the fins nearest the buckets and those most remote therefrom.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination with a turbine wheel, of a cooling wall adjacent a side surface thereof comprising at least in part a plurality interspersed cylindrical rings and rings Z-shaped in section, the radially extending parts of the Z-rings forming a radially extending wall and the axially extending parts being united with the cylindrical rings to form axially extending fins on each side of such wall.

2. The combination with a turbine wheel, of a cooling wall adjacent a surface thereof comprising a plurality of concentric axially extending cylindrical rings, disk rings separating said cylindrical rings, and axially extending flanges on said disk rings united with said cylindrical rings to form axially extending fins of double thickness.

3. A cooling cap for a turbosupercharger wheel comprising inner and outer walls the peripheral ends of which extend axially and are spaced apart, and a wall structure between said ends comprising interspersed axially extending cylinders and rings Z-shaped in section, the radially extending portions of the Z-shaped rings serving as spacers, and the axially extending portion being united to said cylinders to form axially extending fins.

4. The combination with a turbine wheel, of a cooling wall adjacent to a side surface thereof comprising a plurality of axially extending concentric members having central radial offset portions to form a wall parallel with the wheel, adjacent portions of the rings on opposite sides of the wall being in contact to form axially projecting fins having the thickness of the two portions.

WALTER I. NICHOLS.